United States Patent
White et al.

(10) Patent No.: US 11,148,236 B2
(45) Date of Patent: Oct. 19, 2021

(54) PROGNOSTIC MONITORING AND FAILURE DETECTION OF ROTATING COMPONENTS

(71) Applicant: Hamilton Sundstrand Corporation, Charlotte, NC (US)

(72) Inventors: Alexander David White, Essex Jct., VT (US); Ronald D. Poisson, Longmeadow, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 208 days.

(21) Appl. No.: 16/369,592

(22) Filed: Mar. 29, 2019

(65) Prior Publication Data

US 2020/0306900 A1 Oct. 1, 2020

(51) Int. Cl.
  *B23P 6/00* (2006.01)
  *G01D 5/248* (2006.01)
  *F02C 7/277* (2006.01)

(52) U.S. Cl.
  CPC ............ *B23P 6/002* (2013.01); *G01D 5/248* (2013.01); *F02C 7/277* (2013.01); *F05D 2260/80* (2013.01)

(58) Field of Classification Search
  CPC ..... B23P 6/002; G01D 5/248; F05D 2260/80; G01M 13/02
  See application file for complete search history.

(56) References Cited

U.S. PATENT DOCUMENTS

| | | | |
|---|---|---|---|
| 6,445,995 B1* | 9/2002 | Mollmann | G01H 1/006 235/103 |
| 7,392,713 B2 | 7/2008 | Barkhoudarian | |
| 7,421,349 B1* | 9/2008 | Stack | G01M 13/045 340/500 |
| 2007/0055435 A1* | 3/2007 | Muramatsu | F02C 9/28 701/100 |
| 2013/0312423 A1* | 11/2013 | Bacic | F01D 21/003 60/779 |
| 2018/0340475 A1 | 11/2018 | Grigorov et al. | |

FOREIGN PATENT DOCUMENTS

| | | |
|---|---|---|
| EP | 1227325 | 7/2002 |
| WO | 2012119864 | 9/2012 |

OTHER PUBLICATIONS

Extended European Search Report for EP Application No. 19211122.7 dated Jul. 7, 2020.

* cited by examiner

*Primary Examiner* — David Z Huang
(74) *Attorney, Agent, or Firm* — Carlson, Gaskey & Olds, P.C.

(57) ABSTRACT

A method of monitoring a rotating component includes gathering an electrical signal from a sensor arranged adjacent a rotating component of an assembly. The electrical signal is transformed from a time domain into a frequency domain. The electrical signal is compared to an expected signal.

19 Claims, 5 Drawing Sheets

PROGNOSTIC MONITORING AND FAILURE DETECTION OF ROTATING COMPONENTS

BACKGROUND

This disclosure relates to prognostic monitoring and failure detection of rotating components such as air turbine starter components using magnetic speed sensors.

A gas turbine engine typically includes a fan section, a compressor section, a combustor section, and a turbine section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections. The compressor section and turbine section each have multiple stages of blades that rotate about a central axis and multiple stages of vanes that are stationary relative to the central axis.

Many relatively large turbine engines, including turbofan engines, may use magnetic speed sensors to measure the speed of rotating components for the purposes of control and fault detection. An air turbine starter (ATS) is an example of such machinery. An ATS is used to initiate gas turbine engine rotation. The ATS is typically mounted on the accessory gearbox which, in turn, is mounted on the engine or airframe. Active operation of the ATS may occur for a minute or so at the beginning of each flight cycle, along with occasional operation during engine maintenance activities. An ATS encounters large mechanical stresses while converting inlet air pressure into output torque for initiating engine rotation. Each start process causes wear on internal components, such as bearings, shafts, and gears.

SUMMARY

In one exemplary embodiment, a method of monitoring a rotating component includes gathering an electrical signal from a sensor arranged adjacent a rotating component of an assembly. The electrical signal is transformed from a time domain into a frequency domain. The electrical signal is compared to an expected signal.

In a further embodiment of any of the above, the method includes determining whether there is a fault in the assembly based on the comparison to the expected signal.

In a further embodiment of any of the above, the method includes determining a portion of the assembly containing the fault based on the comparison to the expected signal.

In a further embodiment of any of the above, the method includes determining whether the fault corresponds to an issue with a gear system, shaft, or bearing.

In a further embodiment of any of the above, a component of the assembly is replaced or repaired when a fault is detected.

In a further embodiment of any of the above, the comparing step comprises comparing an amplitude of the electrical signal across several frequencies with the expected signal.

In a further embodiment of any of the above, any high amplitude pulses are removed from the electrical signal before the transforming step.

In a further embodiment of any of the above, the rotating component is a gear that has at least one tooth.

In a further embodiment of any of the above, the high amplitude pulses corresponds to at least one tooth passing the sensor.

In a further embodiment of any of the above, the gear has a plurality of teeth spaced about a circumference of the gear.

In a further embodiment of any of the above, the assembly is an air turbine starter.

In a further embodiment of any of the above, the gathering step comprises gathering data at a frequency of at least twice a top rotating frequency of the rotating component.

In a further embodiment of any of the above, the gathering step comprises gathering data at a frequency of at least about 30 kHz.

In a further embodiment of any of the above, the gathering step comprises gathering an electrical signal from a speed range of the rotating component.

In a further embodiment of any of the above, the gathering step comprises gathering the electrical signal for a period of time corresponding to a startup of the component operating through all rotational speed conditions.

In a further embodiment of any of the above, the sensor is a magnetic speed sensor.

In a further embodiment of any of the above, the transforming step comprises performing a Fourier transform.

In another exemplary embodiment, a system for monitoring a rotating component includes a magnetic speed sensor arranged adjacent to a rotating component of an air turbine starter. A processor is configured to gather a signal from the magnetic speed sensor and transform the signal from a time domain into a frequency domain.

In a further embodiment of any of the above, the processor is configured to generate a plot of the signal in the frequency domain.

In a further embodiment of any of the above, the processor is configured to remove any high amplitude peaks in the signal before transforming the signal into the frequency domain.

BRIEF DESCRIPTION OF THE DRAWINGS

The disclosure can be further understood by reference to the following detailed description when considered in connection with the accompanying drawings.

DETAILED DESCRIPTION

Figure 1:
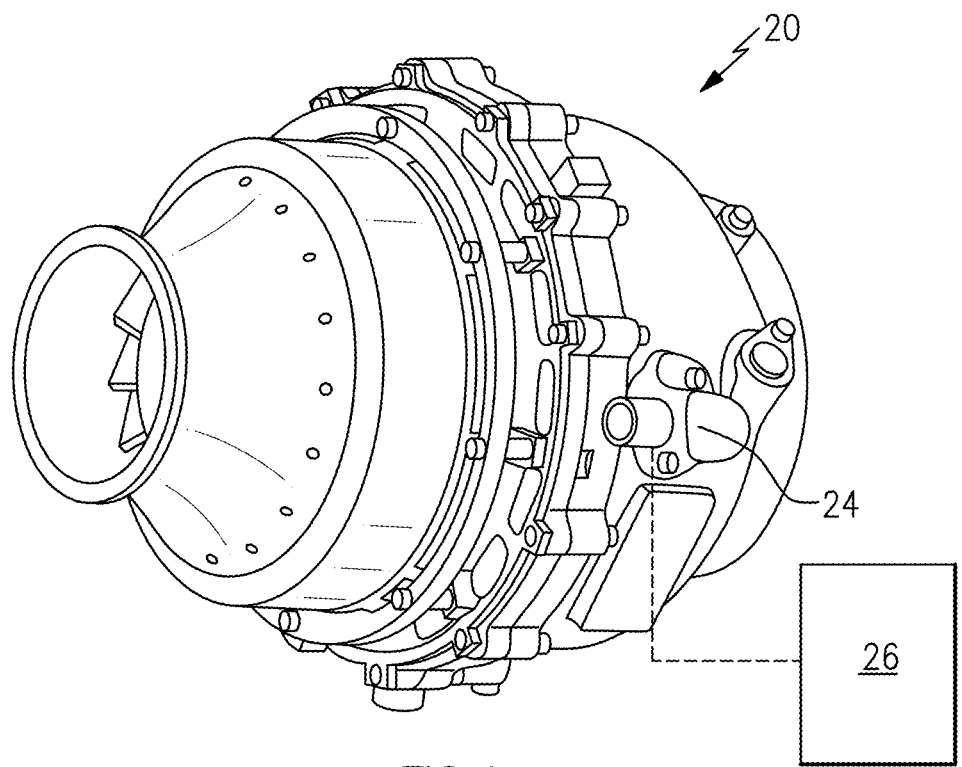
FIG. 1 is a view of an example of an air turbine starter system.

FIG. 1 shows an exemplary air turbine starter (ATS) 20 for a gas turbine engine. The ATS 20 may be mounted on an accessory gearbox which, in turn, is mounted on an engine or airframe. The engine may be a gas turbine engine, for example. Gas turbine engines are known, and may generally include a fan section, a compressor section, a combustor section and a turbine section, among other components. The gas turbine engine may be a two-spool turbofan gas turbine engine, a three-spool architecture, a direct drive turbofan, an industrial gas turbine (IGT), or any gas turbine engine as desired.

It should be appreciated that the present application is not limited to use in conjunction with a specific type of rotating machine. Thus, although the present application is, for convenience of explanation, depicted and described as being implemented in an air turbine starter, the present disclosure may be utilized elsewhere in a gas turbine engine, such as with the fan, high pressure compressor, low pressure compressor, gearbox, or other rotating components. This disclosure may also be implemented in numerous other machines including, but not limited to, a gas turbine engine, an auxiliary power unit, a turbo charger, a super charger, an air cycle machine, an alternator, an electric motor, an electric generator, an integrated constant speed drive generator and gearboxes of various types.

The example ATS 20 has a speed sensor 24 that measures a speed of a rotating component within the ATS 20. In one example, the speed sensor 24 measures the speed of a gear assembly 30 (shown in FIG. 2). A processing system 26 may be connected to the ATS 20 and/or the speed sensor 24 to collect data from the speed sensor 24. In one example embodiment, the processing system 26 includes a portable computer and data acquisition system that is connected to the ATS 20 and/or speed sensor 24 between flights. In another example, the processing system 26 is on board the aircraft.

The processing system 26 may generally include a processor, which may be a dedicated microprocessor or another computing device. The processing system 26 may include memory associated with the processor. In some example embodiments, the memory includes computer-executable instructions that cause the processor to operate for purposes of processing electrical signal data. In some example embodiments, the memory contains information regarding various features or characteristics of the ATS 20, such as a number of gear teeth and/or expected vibration behavior. In some embodiments, a first processing system is located on the aircraft, and calculates a speed of the ATS 20, and a second processing system 26 is connected intermittently to calculate additional parameters.

Figure 2:
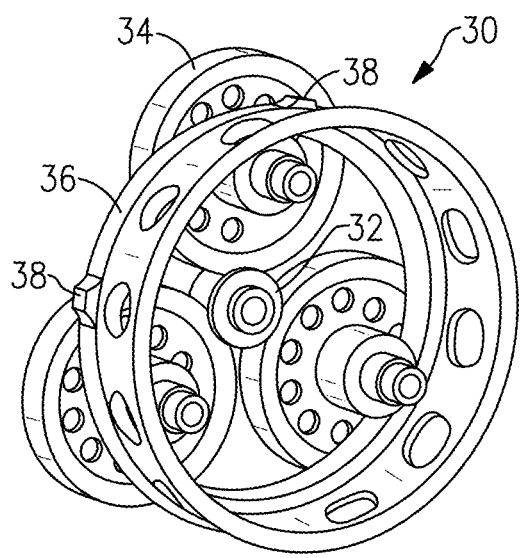
FIG. 2 is a view of an example gear assembly for an air turbine starter system.

FIG. 2 shows an exemplary gear system 30 within the ATS 20. In this example, the gear system 30 is a planetary gear system having a sun gear 32, planet gears 34, and a ring gear 36 rotatable about a shaft. The ring gear 36 has one or more external teeth 38 extending radially outward from a surface of the ring gear 36.

Figure 3:
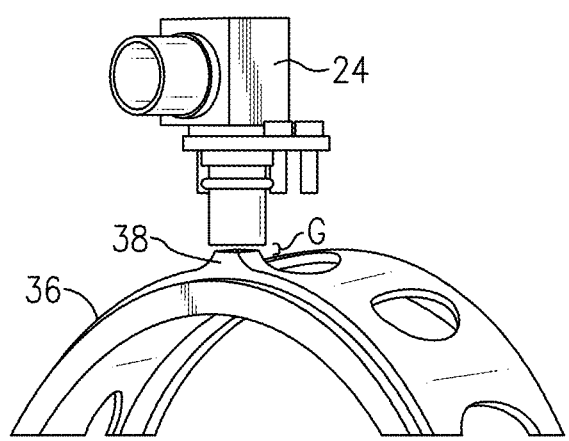
FIG. 3 is a view of an example speed sensor for an air turbine starter system.

FIG. 3 shows a portion of the gear system 30. The speed sensor 24 is arranged adjacent to the ring gear 36. The speed sensor includes a magnet, and picks up on changes in the magnetic field when the teeth 38 pass by. In this example, the ring gear 36 has four teeth 38 equally spaced about the circumference of the ring gear 36. Thus, the speed sensor 24 can determine the speed of rotation of the ring gear 36 by the number of times teeth 38 pass by. Although four teeth 38 are shown, rotating components with more or fewer teeth 38 may come within the scope of this disclosure. In some examples, the teeth 38 may be unequally spaced to help with tooth indexing. The sensor 24 gathers an electrical signal based on the changing magnetic fields of the gear surface 36 passing by, including teeth 38. Output voltage from the sensor 24 is primarily a function of an air gap G between the tooth 38 or gear 36 and the sensor 24 and the surface speed of the gear 36. As a result, the sensor 24 also responds to changes in distance between the surface 37 and the sensor 24, such as passing teeth 38 and vibrations of the gear assembly 30.

Figure 4:
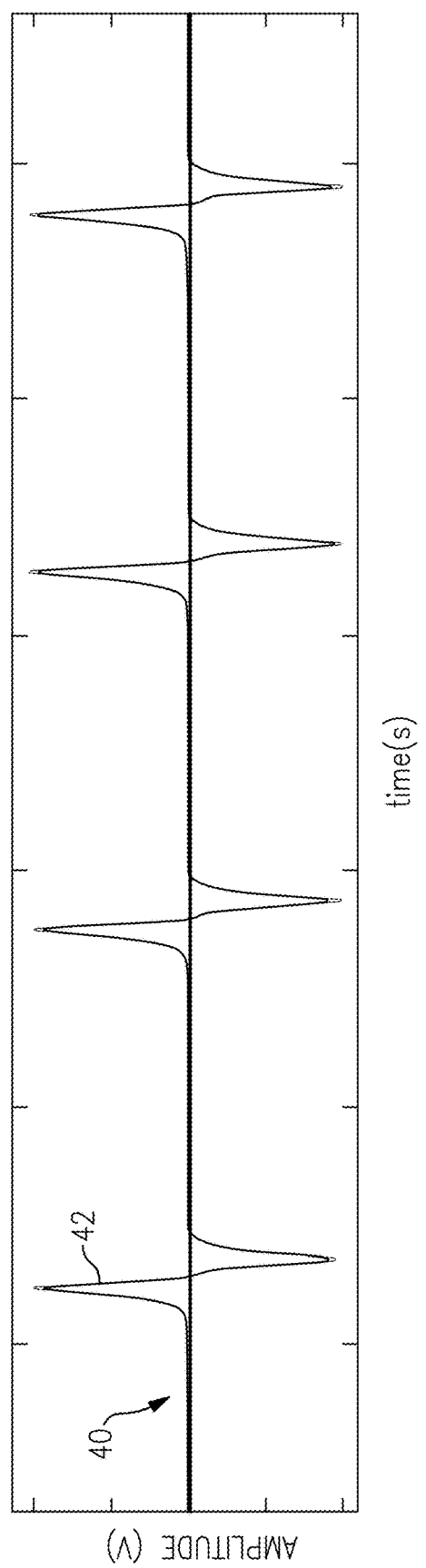
FIG. 4 is an example electrical signal from the example speed sensor
Figure 5:
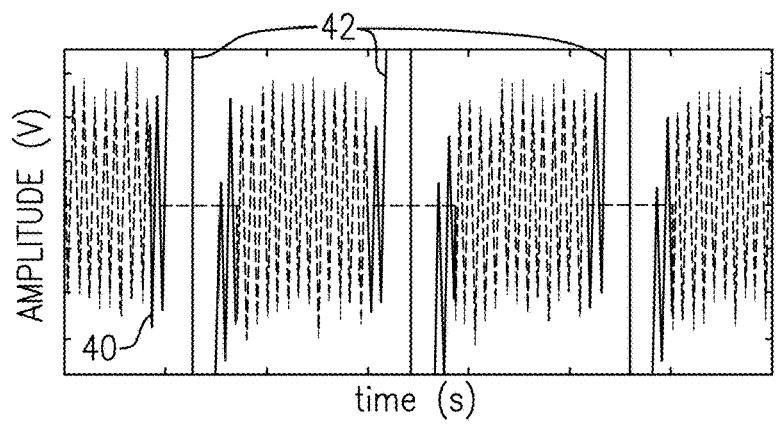
FIG. 5 is a portion of an electrical signal from the example speed sensor.

FIG. 4 is an example of the electrical signal as a result of teeth 38 passing the sensor 24. This plot shows the output signal, or amplitude, in volts on the vertical axis over time in seconds on the horizontal axis. The large peaks 42 correspond to a tooth 38 passing the sensor 24. In one example, the peaks 42 are greater than about 0.5 V. FIG. 5 is a portion of an example electrical signal 40 from the sensor 24 which shows undesirable signal content between teeth 38, caused by a combination of vibration and electrical noise.

Figure 6:
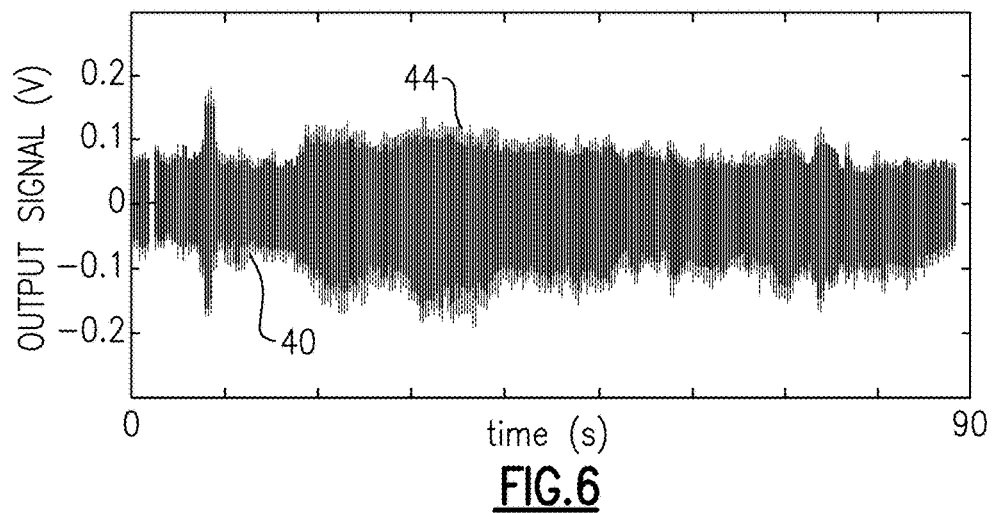
FIG. 6 is a portion of an electrical signal from the example speed sensor.

FIG. 6 is a portion of the electrical signal 40 over the ATS 20 startup cycle, where the tooth passing waveforms have been omitted using digital post-processing methods. In this example, it takes between about 80 and 90 seconds for the ATS 20 to ramp up from 0 RPM to a full speed. The digitally processed signal 40 reveals the amplitude of the noise signals 44 between the peaks 42. Some of this noise 44 corresponds to vibration of the gear 36. For example, as the ring gear 36 vibrates, the distance from the ring gear 36 to the sensor 24 varies, causing the shown varying amplitude in the signal 40. The noise 44 is the signal with an amplitude less than the peaks 42. In one example, the noise 44 has an amplitude of less than about 0.5 V. In a further example, the noise 44 has an amplitude of less than about 0.2 V.

Figure 7:
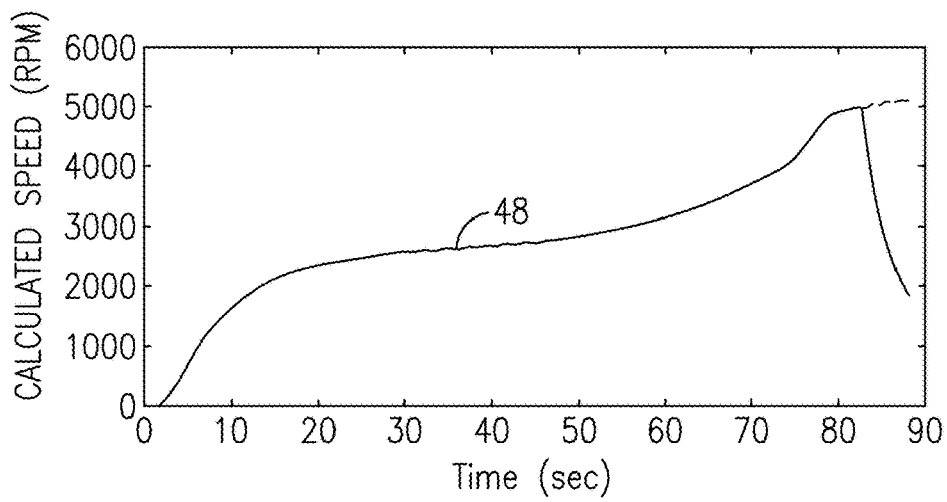
FIG. 7 is a plot of the calculated speed resulting from processing the electrical signal from the example speed sensor.

FIG. 7 is a chart of the calculated speed of the ATS 20 in RPM over time. The plot is generated based on the detection of peaks 42 and the known space between the teeth 38. This plot shows a start cycle for the ATS 20. The speed of the ATS 20 starts at 0 RPM, and ramps up to about 5000 RPM over a period of between about 80 and 90 seconds. Some turbine starters or other rotating components may have a longer ramp up period and/or different operating speeds.

Figure 8:
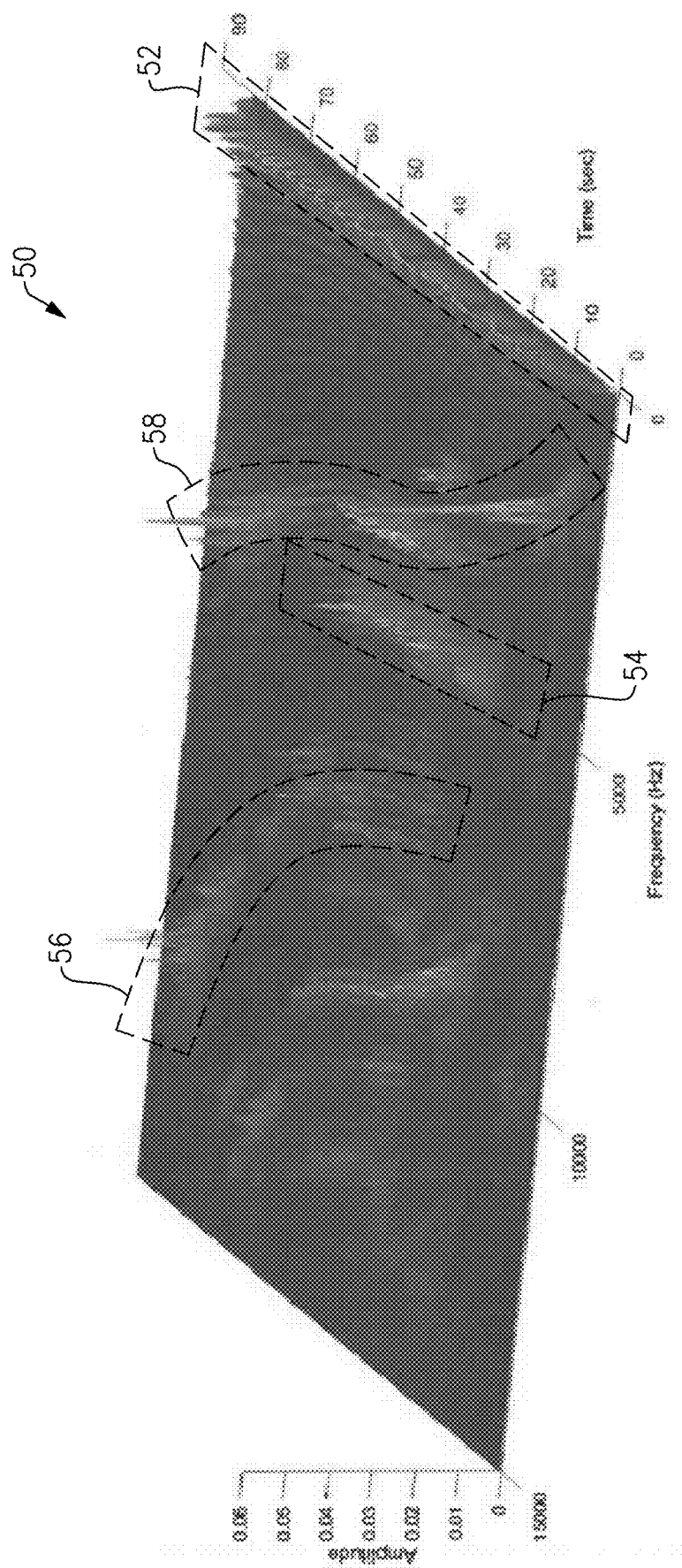
FIG. 8 is an example three dimensional plot of the electrical signal from the example speed sensor.

FIG. 8 is a three dimensional plot 50 of the electrical signal 40 in the frequency domain. The electrical signal of FIGS. 4-6 shows amplitude and speed over time, respectively. Thus, both amplitude and speed are functions of time, and FIGS. 4-6 show a time domain signal. This signal is transformed into the frequency domain to view the frequencies that make up the signal. In one example, a Fourier Transform is used to convert the time domain signal into the frequency domain. A Fourier Transform decomposes a function of time into frequencies. The transformation into the frequency domain may be done using the known Fast Fourier Transform (FFT) algorithm.

The plot of FIG. 8 shows the amplitude over time and across frequencies. The signal 40 must be gathered for all speeds of the ATS 20. For the example ATS 20, the ramp up period is about 90 seconds. Thus, 90 seconds of signal 40 must be gathered to collect data for all speeds of the ATS 20. For other components, the component may go through all speeds in a shorter time, and thus a shorter time for the signal may be sufficient. The sensor 24 should be sampled at a rate of at least twice the frequency of the highest expected vibration frequency of the rotating components. This ensures sufficient data in the noise 44 of the signal 40 to provide meaningful information about vibrations of the ATS 20 in the frequency domain. In one example, the sensor 24 is sampled at a rate of at least about 15 kHz. In a further example, the sensor 24 is sampled at a rate of at least about 30 kHz. In some examples, the sensor 24 is sampled at a rate of between 200 kHz and 2,000 kHz.

The frequency data of plot 50 provides information about the ATS 20. The various noise contributing sources in the plot 50 provide information about particular components within the ATS 20. The components within an ATS 20 have expected vibration behaviors, and deviations from these behaviors within plot 50 may indicate faults or unacceptable wear in the ATS 20. For example, there is a group of peaks 52 at a very low frequency, between about 1 and 80 Hz for the entire length of the signal 40. This group 52 corresponds to noise contributions from the ring gear 36, bearings, and output shaft, based on the detected frequencies. A series of peaks 54 at about 5000 Hz may be indicative of system or sensor resonance, since they are all about the same frequency for the entire time signal and are not a function of rotational speed. A series of peaks 56 corresponds to the meshing of the planet gear 34 and the sun gear 32. The series of peaks 58 corresponds to the meshing of the ring gear 36 and the planet gear 34.

Based on any unexpected peaks, a fault or abnormality in the ATS 20 may be detected. In some examples, a fault may indicate a component failure, a fault may be a defect in the component, a fault may be an abnormality in the component, or a fault may indicate wear on the component that suggests it may fail. That is, a fault or unacceptable wear detected may predict a failure of a component in the ATS 20 before it occurs. Unexpected peaks are any that do not show up on a plot for a good ATS 20 that is known to have no faults or defects. The location of any unexpected peaks may indicate which component within the ATS 20 has a fault. For example, the plot 50 may reveal faults associated with the sun gear 32, ring gear 36, planet gear 34, shaft 39, or a bearing in the ATS 20. The plot 50 is compared to an expected signal that would be based on a healthy ATS 20 with no defects. Each individual frequency is analyzed to identify any deviance from the expected signal.

Figure 9:
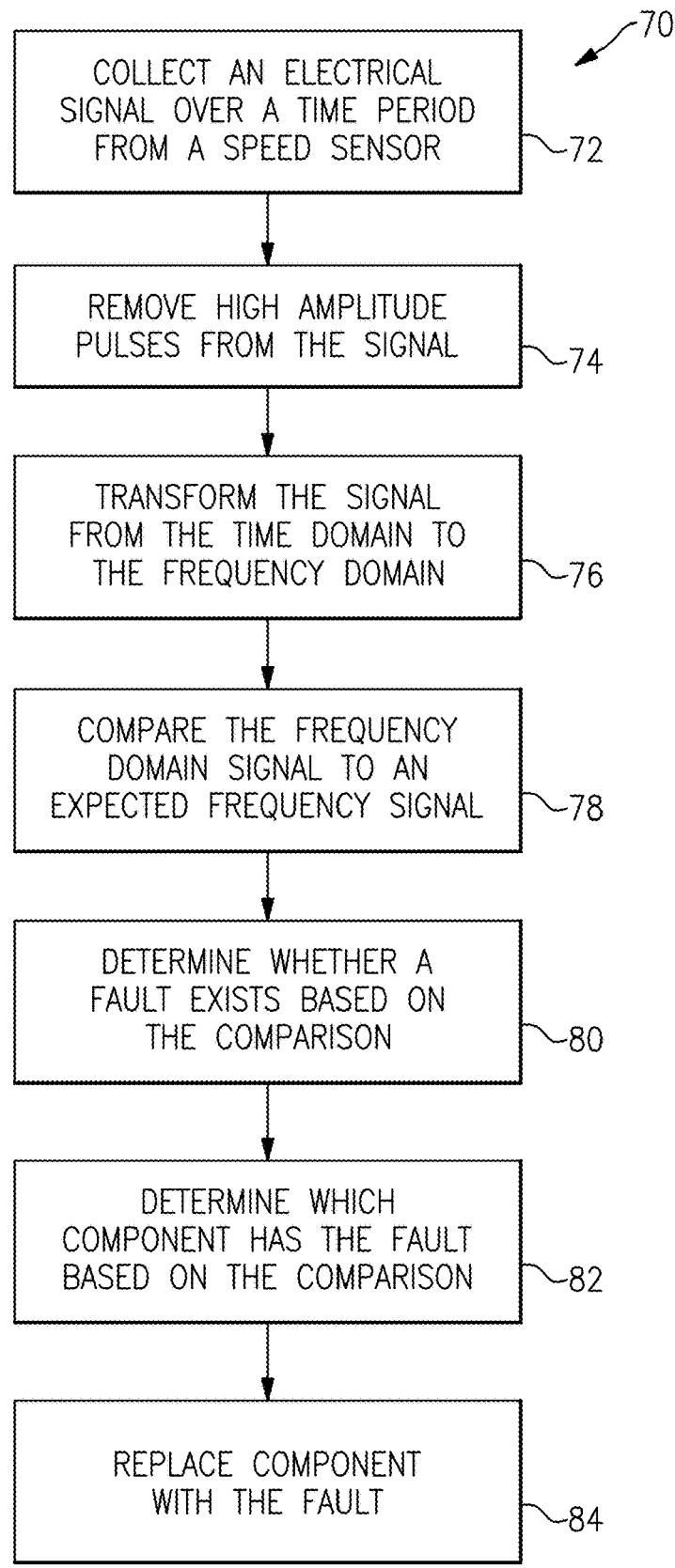
FIG. 9 is an example method of monitoring an air turbine starter component.

FIG. 9 summarizes an example method 70 of monitoring a rotating component. A processing system 26 collects data, and in particular an electrical signal 40, from the sensor 24 at 72. In one example, this occurs between flights during engine maintenance. The processing system 26 may collect data while the component is running, or may collect data stored previously. In some examples, the processing system 26 removes high amplitude pulses from the signal 40 at 74. These pulses correspond to the teeth 38 passing the sensor 24, and are used to calculate speed. In addition to speed information, this signal 40 contains supplemental information regarding vibrations of the ATS 20. The signal 40 is then transformed from the time domain to the frequency domain at 76. In one example, the processing system 26 generates a three dimensional plot 50 of time, frequency, and amplitude at this step. In some embodiments, the system 26 may generate another type of plot that displays time, frequency, and amplitude, such as a two dimensional plot with varying colors indicating frequency or amplitude over time at 76.

The frequency domain signal is then compared to an expected signal at 78. The three dimensional plot 50 is analyzed to identify irregular or unexpected peaks in comparison with an expected signal at 80. Irregular peaks in the plot 50 suggest a component is vibrating more than expected, which may indicate a fault in the component. The three dimensional plot 50 is further analyzed to identify which component may have a fault at 82. Irregular peaks at particular times and frequencies may indicate a fault with a particular component within the ATS 20. If a fault in a particular component is detected, the component or the entire ATS 20 may be replaced at 84. Replacing a component may include repairing the component. This method provides a way to monitor health over time and to predict failures of the ATS 20.

In one example, this method 70 is used during ground operations. For example, the method 70 may be performed by hooking the processing system 26, such as a portable computer, to the sensor 24, and starting up the ATS 20. The portable computer then gathers and stores the electrical signal 40 generated by the sensor 24 for a period of time, such as 60-90 seconds. This method would be performed between flights as part of the engine maintenance. In another example, a data storage component is located on the aircraft that stores the electrical signal 40 gathered during a flight. This electrical signal data is then transferred to the processing system 26 after the flight, and the signal 40 is analyzed according to the above described method 70. In another example, a processing system 26 is located on the aircraft in addition to the onboard data collection system. The processing system 26 may be either dedicated or integrated with control or diagnostic electronics on the aircraft. The signal 40 is analyzed at each usage of the component, or at regular intervals of usage, using this method 70.

Known air turbine starters 20 encounter large mechanical stresses while initiating engine rotation. Each start process causes wear on internal components, such as bearings, shafts, and gears. Wear may result in failed engine starts, flight delays and/or flight cancellations. Known ATS maintenance methods include keeping track of the length of time and/or number of start cycles an ATS 20 has done, and replacing components after a certain number of operating hours. If an ATS component fails before the expiration time, it may not be caught until a failed engine start. The disclosed monitoring method 70 may predict the failure of the air turbine starter 20 and/or any components of the ATS 20, and enables the premature replacement of the unit at a more conveniently scheduled time. The disclosed method of analyzing and monitoring a rotating component relies on the electrical signal generated by the existing speed sensors on the component, expanding the capabilities of existing sensor technology. The method monitors internal vibrations in the ATS, and enables operators to monitor individual components within the ATS without having to disassemble the ATS for inspection.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of monitoring a rotating component, comprising:
   gathering an electrical signal from a sensor arranged adjacent a rotating component of an assembly;
   transforming the electrical signal from a time domain into a frequency domain; and
   comparing the electrical signal in the frequency domain to an expected signal;
   determining whether there is a fault in the assembly based on the comparison to the expected signal;
   determining which portion of the assembly contains the fault based on the comparison to the expected signal, wherein the portions of the assembly comprise a gear system, a shaft, and a bearing;
   wherein the gathering step comprises gathering the electrical signal for a period of time corresponding to a startup of the rotating component operating through all rotational speed conditions from 0 RPM to a full speed of the rotating component.

2. The method of claim 1, comprising replacing or repairing a component of the assembly when a fault is detected.

3. The method of claim 1, wherein the comparing step comprises comparing an amplitude of the electrical signal across several frequencies with the expected signal.

4. The method of claim 1, wherein the rotating component is a gear having at least one tooth, the method comprising removing any high amplitude pulses that correspond to at least one tooth passing the sensor from the electrical signal before the transforming step.

5. The method of claim 4, wherein the high amplitude pulses have an amplitude greater than 0.5 Volts.

6. The method of claim 1, wherein the rotating component is a gear having at least one tooth.

7. The method of claim 6, wherein the gear has a plurality of teeth spaced about a circumference of the gear.

8. The method of claim 1, wherein the assembly is an air turbine starter.

9. The method of claim 1, wherein the gathering step comprises gathering data at a frequency of at least twice a top rotating frequency of the rotating component.

10. The method of claim 1, wherein the gathering step comprises gathering data at a frequency of at least 30 kHz.

11. The method of claim 10, wherein the gathering step comprises gathering data at a frequency between 200 kHz and 2000 kHz.

12. The method of claim 1, wherein the gathering step comprises gathering an electrical signal from a speed range of the rotating component.

13. The method of claim 12, wherein the speed range of the rotating component is between 0 and 5000 RPM.

14. The method of claim 1, wherein the sensor is a magnetic speed sensor.

15. The method of claim 1, wherein the transforming step comprises performing a Fourier transform.

16. The method of claim 1, wherein the comparing the electrical signal to an expected signal comprises generating a plot of the electrical signal.

17. The method of claim 1, wherein the period of time is between 80 and 90 seconds.

18. A system for monitoring a rotating component, comprising:
   a magnetic speed sensor arranged adjacent to a rotating component of an air turbine starter, the air turbine starter having a plurality of components; and
   a processor configured to gather a signal from the magnetic speed sensor and transform the signal from a time domain into a frequency domain, generate a plot of the signal in the frequency domain, compare the plot to an expected signal, determine whether there is a fault in the air turbine starter based on the comparison to the expected signal, and determine which component of the air turbine starter contains the fault based on the comparison to the expected signal,
   wherein the processor is further configured to gather the signal for a period of time corresponding to a startup of the rotating component operating through all rotational speed conditions from 0 RPM to a full speed of the rotating component.

19. The system of claim 18, wherein the rotating component comprises a gear having at least one tooth, and the processor is configured to remove any high amplitude peaks in the signal that correspond to the at least one tooth passing the magnetic speed sensor before transforming the signal into the frequency domain.

* * * * *